(12) United States Patent
Wei et al.

(10) Patent No.: US 12,363,399 B2
(45) Date of Patent: Jul. 15, 2025

(54) VIDEO CLIPPING METHOD AND MODEL TRAINING METHOD

(71) Applicant: Beijing Baidu Netcom Science Technology Co., Ltd., Beijing (CN)

(72) Inventors: Chengdong Wei, Beijing (CN); Jiechao Ding, Beijing (CN); Rui Gao, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 21 days.

(21) Appl. No.: 18/092,608

(22) Filed: Jan. 3, 2023

(65) Prior Publication Data
US 2023/0224556 A1    Jul. 13, 2023

(30) Foreign Application Priority Data
Jan. 10, 2022   (CN) .......................... 202210023573.0

(51) Int. Cl.
*H04N 21/845* (2011.01)
*G06V 30/148* (2022.01)
(Continued)

(52) U.S. Cl.
CPC ....... *H04N 21/8456* (2013.01); *G06V 30/153* (2022.01); *G06V 40/20* (2022.01); *H04N 21/4666* (2013.01)

(58) Field of Classification Search
CPC ........... H04N 21/8456; H04N 21/4666; G06V 30/153; G06V 40/20
(Continued)

(56) References Cited

U.S. PATENT DOCUMENTS

| 10,515,133 | B1 | 12/2019 | Sharifi |
| 10,943,125 | B1 | 3/2021 | Evans et al. |

(Continued)

FOREIGN PATENT DOCUMENTS

| CN | 102348049 A | 2/2012 |
| CN | 102547139 A | 7/2012 |

(Continued)

OTHER PUBLICATIONS

U.S. Patent and Trademark Office; Non-Final Office Action; U.S. Appl. No. 18/049,160; 24 pages; dated Aug. 17, 2023.
(Continued)

*Primary Examiner* — Stephen S Hong
*Assistant Examiner* — Tionna M Burke
(74) *Attorney, Agent, or Firm* — Faegre Drinker Biddle & Reath LLP

(57) ABSTRACT

Provided are a video clipping and model training method, relating to the field of video technologies, and in particular, to the field of short video technologies. The video clipping method includes: acquiring interaction behavior data for an original video file; determining interaction heat at respective time points of the original video file, according to the interaction behavior data; selecting N time points with highest interaction heat, to take the selected time points as interest points of the original video file, where N is a positive integer; and clipping the original video file based on the respective interest points, to obtain N clipped video files. Therefore, high-quality short video files can be generated.

20 Claims, 9 Drawing Sheets

(51) Int. Cl.
*G06V 40/20* (2022.01)
*H04N 21/466* (2011.01)

(58) Field of Classification Search
USPC .......................................................... 715/723
See application file for complete search history.

(56) References Cited

U.S. PATENT DOCUMENTS

| | | | |
|---|---|---|---|
| 2012/0017152 A1* | 1/2012 | Matsuda | G11B 27/34 |
| | | | 715/723 |
| 2017/0195753 A1 | 7/2017 | Dakss et al. | |
| 2018/0329928 A1 | 11/2018 | Gupta et al. | |
| 2019/0222869 A1 | 7/2019 | Lasser | |
| 2021/0110163 A1 | 4/2021 | Culbertson et al. | |
| 2021/0120319 A1 | 4/2021 | Zhou et al. | |
| 2021/0216783 A1* | 7/2021 | Long | G06F 18/214 |
| 2021/0349883 A1* | 11/2021 | Majumdar | H04N 21/6582 |
| 2022/0027578 A1* | 1/2022 | Chorakhalikar | G06N 5/022 |

FOREIGN PATENT DOCUMENTS

| | | | |
|---|---|---|---|
| CN | 104519401 A | 4/2015 | |
| CN | 107615766 A | 1/2018 | |
| CN | 107623860 A | 1/2018 | |
| CN | 108694236 A | 10/2018 | |
| CN | 108829881 A | 11/2018 | |
| CN | 109040796 A | 12/2018 | |
| CN | 109104642 A | 12/2018 | |
| CN | 109495765 A | 3/2019 | |
| CN | 110234037 A | 9/2019 | |
| CN | 110399526 A | 11/2019 | |
| CN | 110738026 A | 1/2020 | |
| CN | 111144108 A | 5/2020 | |
| CN | 111428087 A | 7/2020 | |
| CN | 111444387 A | 7/2020 | |
| CN | 111757147 A | 10/2020 | |
| CN | 112104919 A | 12/2020 | |
| CN | 112511854 A | 3/2021 | |
| CN | 112714340 A | 4/2021 | |
| CN | 113011172 A | 6/2021 | |
| CN | 110234037 B | 8/2021 | |
| CN | 113704549 A | 11/2021 | |
| CN | 113747241 A | 12/2021 | |
| WO | 2004/090752 A1 | 10/2004 | |
| WO | 2015/101385 A1 | 7/2015 | |
| WO | 2018040059 A1 | 3/2018 | |

OTHER PUBLICATIONS

U.S. Patent and Trademark Office; Final Office Action; U.S. Appl. No. 18/049,160; 23 pages; dated Nov. 30, 2023.
McCormick, Chris et al.; BERT Word Embeddings Tutorial; https://mccormickml.com/2019/05/14/BERT-word-embeddings-tutorial/; 31 pages; May 14, 2019.
Moradi, Milad et al.; Deep contextualized embeddings for quantifying the informative content in biomedical text summarization; Computer Methods and Programs in Biomedicine; 19 pages; Oct. 2019.
Kaviani, Mohadeseh et al.; EmHash: Hashtag Recommendation using Neural Network based on BERT Embedding; 2020 6th International Conference on Web Research (ICWR); 6 pages; Apr. 2020.
Amirian, Soheyla et al.; Automatic Generation of Descriptive Titles for Video Clips Using Deep Learning; Department of Computer Science, The University of Georgia; 13 pages; Apr. 2021.
European Patent Office; Extended European Search Report; EP Application No. 22208819.7; 7 pages; dated May 15, 2023.
European Patent Office; Partial European Search Report; EP Application No. 23150255.0; 15 pages; dated Apr. 12, 2023.
European Patent Office; Extended European Search Report; EP Application No. 23150255.0; 11 pages; dated Jul. 19, 2023.
Anonymous; Long short-term memory; Wikipedia; 13 pages; dated Jan. 4, 2022.
China National Intellectual Property Administration; Chinese First Office Action; Chinese Application No. 202210023596.1; 9 pages; dated Jun. 25, 2023.
China National Intellectual Property Administration; Chinese Supplementary Search Report; Chinese Application No. 202210023596.1; 2 pages; dated Aug. 15, 2023.
The State Intellectual Property Office of People's Republic of China; Chinese First Office Action; Chinese Application No. 202210023573.0; 29 pages; dated Aug. 16, 2022.

* cited by examiner

VIDEO CLIPPING METHOD AND MODEL TRAINING METHOD

CROSS-REFERENCE TO RELATED APPLICATIONS

The present application claims the priority from Chinese Patent Application No. 202210023573.0, filed with the Chinese Patent Office on Jan. 10, 2022, the content of which is hereby incorporated herein by reference in its entirety.

TECHNICAL FIELD

The present disclosure relates to the field of video technologies, and in particular, to the field of short video technologies. Specifically, the present disclosure relates to a video clipping and model training method and device.

BACKGROUND

With the development of video technologies and the popularity of short video platform, a large amount of information is spread through short video. How to create or generate short videos has become a technical problem to be solved.

SUMMARY

The present disclosure provides a video clipping and model training method and device.

According to one aspect of the present discourse, there is provided a video clipping method, including: acquiring interaction behavior data for an original video file; determining interaction heat at respective time points of the original video file, according to the interaction behavior data; selecting N time points with highest interaction heat, to take the selected time points as interest points of the original video file, where N is a positive integer; and clipping the original video file based on the respective interest points, to obtain N clipped video files.

According to another aspect of the present discourse, there is provided a training method of a neural network model, including: acquiring a plurality of sample data, where each sample datum includes interaction behavior data within a time range containing an interest point in a video file, a first time distance marker value between the interest point and a clipping start point, and a second time distance marker value between the interest point and a clipping end point; inputting, for each sample datum, the interaction behavior data within the time range containing the interest point in the video file into an initial neural network model, to enable the initial neural network model to output a first time distance prediction value between the interest point and the clipping start point, and a second time distance prediction value between the interest point and the clipping end point; determining a loss function by adopting the first time distance marker value of the plurality of sample data, the second time distance marker value of the plurality of sample data, the first time distance prediction value of the plurality of sample data and the second time distance prediction value of the plurality of sample data; and adjusting, by using the loss function, a parameter of the initial neural network model until the loss function converges, to obtain a trained neural network model.

According to still another aspect of the present discourse, there is provided a video clipping device, including: a data acquisition module configured to acquire interaction behavior data for an original video file; an interaction heat determination module configured to determine interaction heat at respective time points of the original video file, according to the interaction behavior data; a selection module configured to select N time points with highest interaction heat, to take the selected time points as interest points of the original video file, where N is a positive integer; and a preliminary clipping module configured to clip the original video file based on the respective interest points, to obtain N clipped video files.

According to still yet another aspect of the present discourse, there is provided a training device of a neural network model, including: a sample acquisition module configured to acquire a plurality of sample data, where each sample datum includes interaction behavior data within a time range containing an interest point in a video file, a first time distance marker value between the interest point and a clipping start point, and a second time distance marker value between the interest point and a clipping end point; an input module configured to input, for each sample datum, the interaction behavior data within the time range containing the interest point in the video file into an initial neural network model, to enable the initial neural network model to output a first time distance prediction value between the interest point and the clipping start point, and a second time distance prediction value between the interest point and the clipping end point; a loss function determination module configured to determine a loss function by adopting the first time distance marker value of the plurality of sample data, the second time distance marker value of the plurality of sample data, the first time distance prediction value of the plurality of sample data and the second time distance prediction value of the plurality of sample data; and an adjustment module configured to adjust, by using the loss function, a parameter of the initial neural network model until the loss function converges, to obtain a trained neural network model.

According to still yet another aspect of the present discourse, there is provided an electronic device, including: at least one processor; and a memory connected in communication with the at least one processor. The memory stores an instruction executable by the at least one processor, and the instruction, when executed by the at least one processor, enables the at least one processor to execute any one of the above-mentioned methods.

According to still yet another aspect of the present discourse, there is provided a non-transitory computer-readable storage medium storing a computer instruction thereon, and the computer instruction is used to cause a computer to execute any one of the above-mentioned methods.

According to still yet another aspect of the present discourse, there is provided a computer program product including a computer program, and the computer program implements any one of the above-mentioned methods, when executed by a processor.

By adopting the present disclosure, the interest points in the original video file can be determined according to the user's interaction behavior data on the original video file, and the original video file can be clipped based on the interest points to obtain a plurality of clipped video files, that is, short videos. Because the clipped short video contains the part of the original video file that users are most interested in, the short video obtained in this way is of high quality, more in line with users' preferences, and has high application value.

It should be understood that the content described in this part is not intended to identify crucial or important features of embodiments of the present disclosure, nor is it used to limit the scope of the present disclosure. Other features of the present disclosure will be easily understood through the following description.

BRIEF DESCRIPTION OF THE DRAWINGS

The accompanying drawings are provided to better understand the present solution, and do not constitute a limitation to the present disclosure.

DETAILED DESCRIPTION

The following describes exemplary embodiments of the present disclosure with reference to the accompanying drawings, where various details of the embodiments of the present disclosure are included to facilitate understanding, and should be considered as merely exemplary. Therefore, those of ordinary skill in the art should realize that various changes and modifications can be made to the embodiments described herein without departing from the scope and spirit of the present disclosure. Likewise, for clarity and conciseness, descriptions of well-known functions and structures are omitted in the following description.

Figure 1:
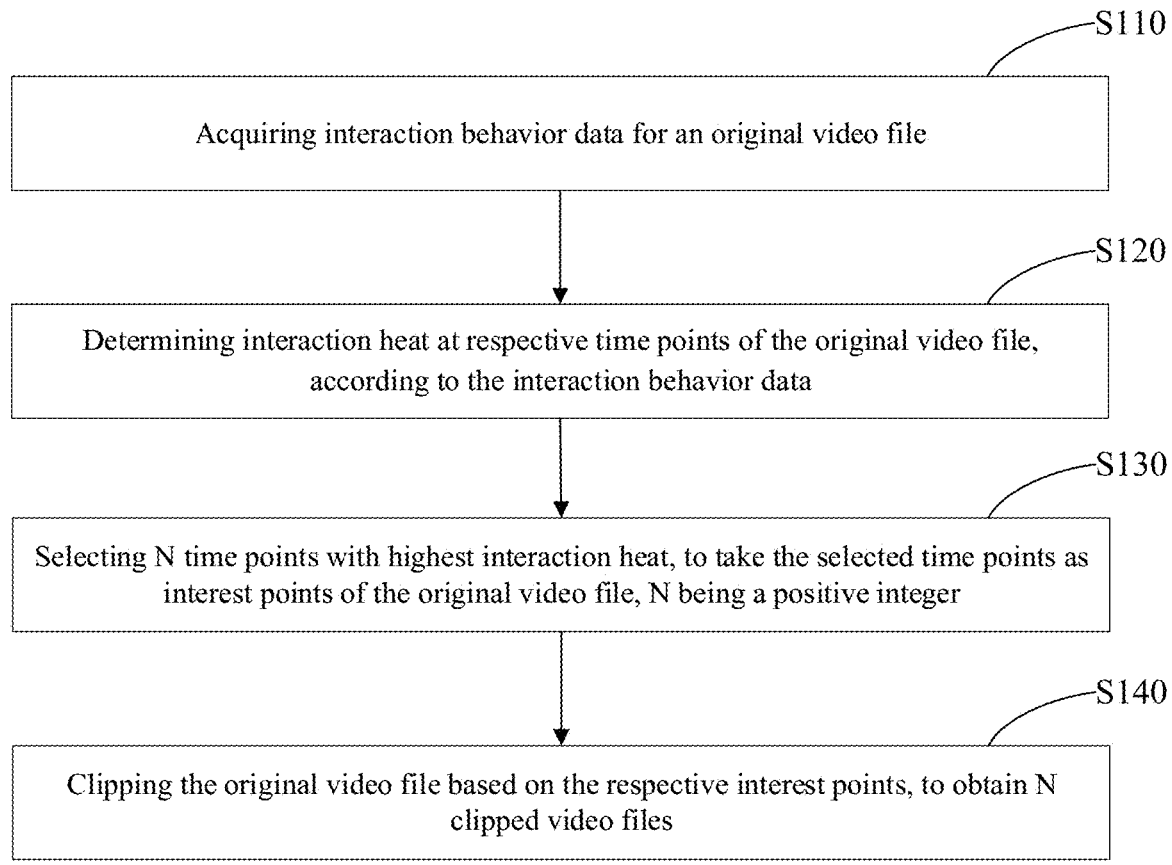
FIG. 1 is an exemplary flowchart of a video clipping method according to an embodiment of the present disclosure.

The embodiments of the present disclosure propose a video clipping method. FIG. 1 is an exemplary flowchart of a video clipping method according to an embodiment of the present disclosure, and the method includes the followings.

In S110, interaction behavior data is acquired for an original video file.

In S120, interaction heat at respective time points of the original video file is determined, according to the interaction behavior data.

In S130, N time points with highest interaction heat are selected, to take the selected time points as interest points of the original video file, N being a positive integer.

In S140, the original video file is clipped based on the respective interest points, to obtain N clipped video files.

In some implementation modes, the original video file may include a video file with a length of several hours or tens of minutes or an approximate length, and such a video file may be called a long video. The clipped video file may be a video file with a length of several minutes or tens of seconds or an approximate length, and such a video file may be called a short video.

Taking the original video file as a long video and the clipped video file as a short video as an example, in the above step S140, the original video file is clipped based on the respective interest points to obtain N clipped video files, which may mean that the long video is clipped to obtain N short videos, and each of short videos contains one of the above interest points. Since the interaction heat may reflect the user's preference for video clips, the use of the time point with the highest interaction heat as the interest point is allowed to cut out a plurality of video clips of interest to the user as short videos.

Figure 2:
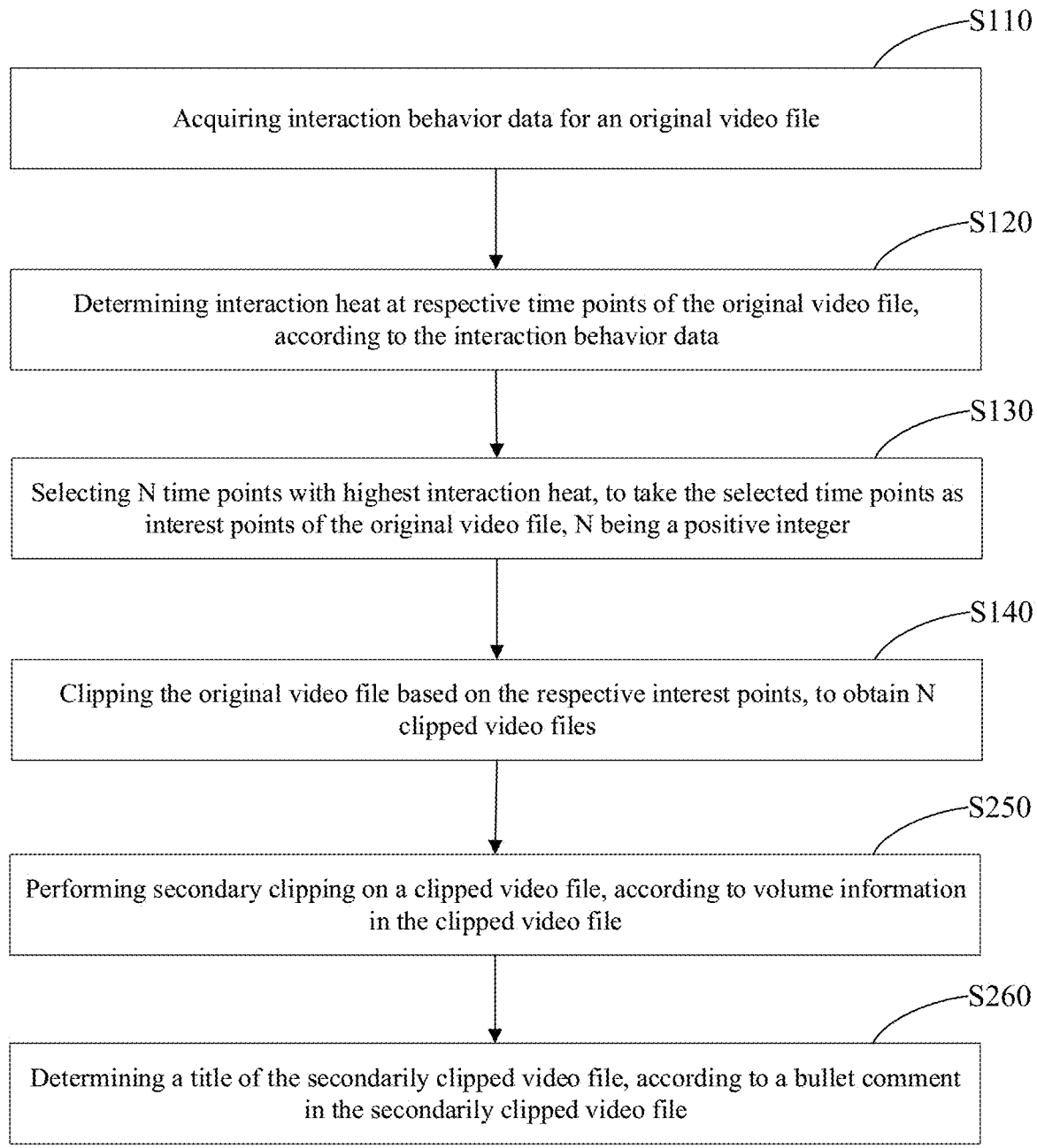
FIG. 2 is an exemplary flowchart of a video clipping method according to another embodiment of the present disclosure.

After the above clipping, the present disclosure may further clip a clipped video file. This clipping may be called secondary clipping. Accordingly, the clipping in step S140 may be called preliminary clipping. FIG. 2 is an exemplary flowchart of a video clipping method according to another embodiment of the present disclosure. As shown in FIG. 2, after the above step S140, the method further includes the followings.

In S250, secondary clipping is performed on a clipped video file (i.e., a preliminarily clipped video file), according to volume information in the clipped video file.

After the above secondary clipping, the present disclosure may also determine a title of the video file after the secondary clipping. Taking the method shown in FIG. 2 as an example, after the above S250, the method further includes the followings.

In S260, a title of the secondarily clipped video file is determined, according to a bullet comment in the secondarily clipped video file.

Alternatively, in some possible implementations, the present disclosure may also generate a title for the preliminarily clipped video file after the above step S140; for example, a title of the preliminarily clipped video file is determined, according to the bullet comment in the preliminarily clipped video file.

The above processes will be described in detail below with reference to the accompanying figures.

Figure 3:
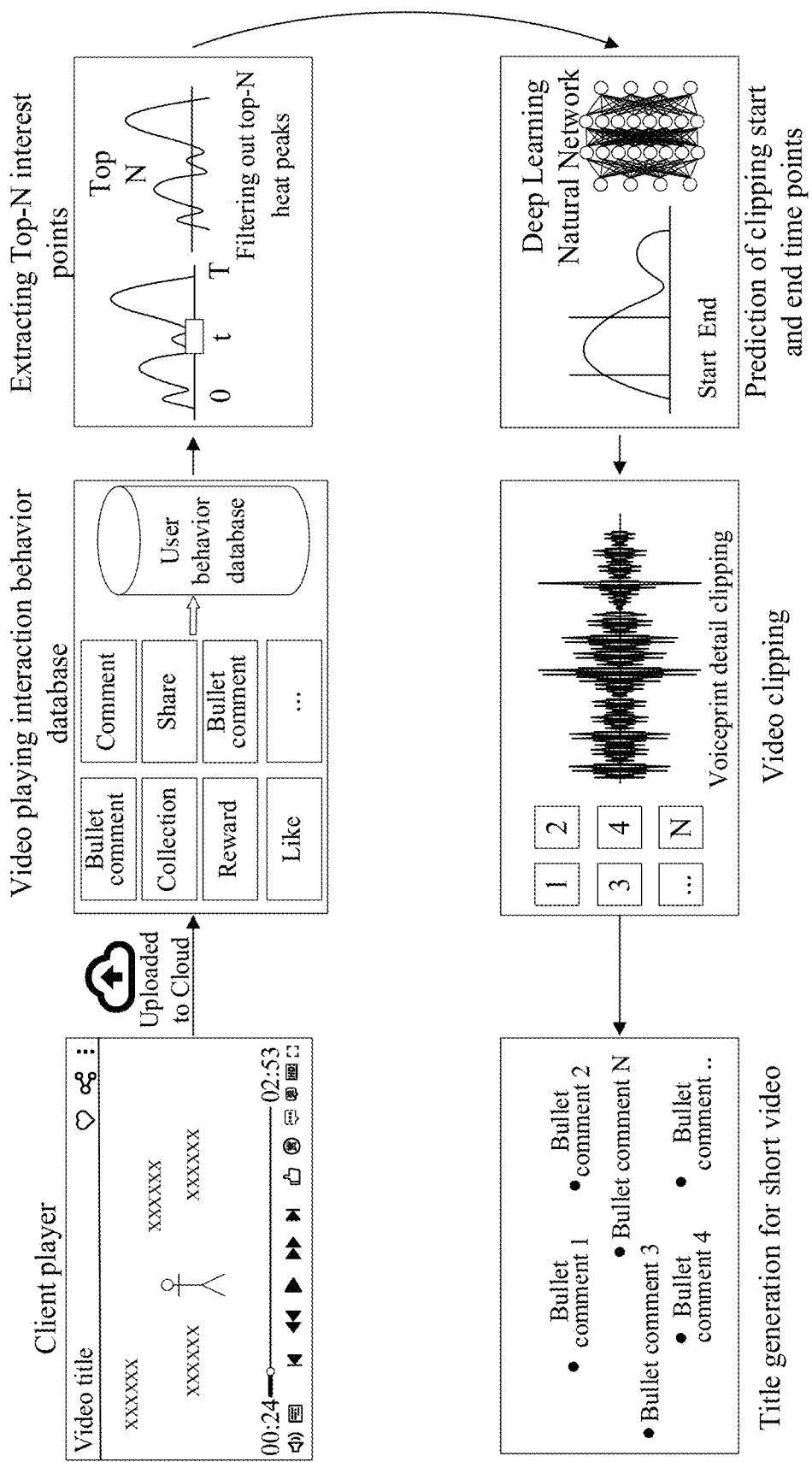
FIG. 3 is a flowchart of a video clipping scheme according to an embodiment of the present disclosure.

FIG. 3 is a flowchart of a video clipping scheme according to an embodiment of the present disclosure. As shown in FIG. 3, the video clipping scheme proposed by the present disclosure mainly includes the following steps. User interaction behavior data is collected from a video playback terminal (such as a client player); N time points with the highest interaction heat are determined according to the interaction behavior data, and the N time points with the highest interaction heat are taken as N interest points (i.e., Top-N interest points); for respective interest points, start and end points of clipping are determined and used for preliminary clipping; for each preliminarily clipped video file, the secondary cropping is performed according to volume information; a title is generated for the clipped video file.

In some implementations, the above acquisition of the interaction behavior data for the original video file includes: acquiring interaction behavior data for the original video file, from a user behavior database. The user behavior database records interaction behavior data of a plurality of video files from a video playback terminal, and the interaction behavior data of the plurality of video files includes at least one of: an identifier of each video file, a total duration of the video file, an interaction behavior of the video file, or a time point of the interaction behavior in the video file.

For example, the identifier of the above video file may include a video number (i.e., ID), which may be a unique label of the video file. A Cloud platform and a user behavior database of the Cloud platform may uniquely determine a specific video file according to the video number.

The total duration may include a total duration of the video file.

The above interaction behavior may include at least one of collecting, sharing, posting a bullet comment, posting a comment, rewarding or clicking "like".

The time point of the above interaction behavior in the video file may include a time point in playback duration of the video file when the interaction behavior of the user occurs.

For example, a video file has an ID of 001 and a total duration of 2 hours. A User A clicks "collection" when it is played to the 15th minute, and posts a bullet comment when it is played to the 20th minute. A video playback terminal may report interaction behavior data of User A for the video file to the Cloud platform. The interaction behavior data may include at least the following information:

[Video file ID=001;
Total duration=2 hours;
Interaction behavior: collecting, corresponding time point: 15th minute;
Interaction behavior: posting a bullet comment, corresponding time point: 20th minute].

For the video file, a User B clicks "share" when it is played to the 18th minute, and posts a comment when it is played to the 25th minute. The video playback terminal may report interaction behavior data of User B for the video file to the Cloud platform. The interaction behavior data may at least include the following information:

[Video file ID=001;
Total duration=2 hours;
Interaction behavior: sharing, corresponding time point: 18th minute;
Interaction behavior: posting a comment, corresponding time point: 25th minute].

The user behavior database in the Cloud platform may count and save the interaction behavior data reported by respective video player terminals. For example, for the foregoing video file with ID 001, the user behavior database counts interaction behavior data reported by User A and User B through the video player terminals, which may include the following information:

[Video file ID=001;
Total duration=2 hours;
Interaction behavior: collecting, corresponding time point: 15th minute;
Interaction behavior: sharing, corresponding time point: 18th minute;
Interaction behavior: posting a bullet comment, corresponding time point: 20th minute;
Interaction behavior: posting a comment, corresponding time point: 25th minute].

With the gradual increase of interaction behavior data reported by video playback terminals, the interaction behavior data for respective video files counted in the user behavior database of the Cloud platform is also gradually enriched. Therefore, the interaction behavior data obtained from the cloud database may represent interests of most users for the video files. The interaction behavior data includes various interaction behavior such as collecting, sharing, posting a bullet comment, posting a comment, rewarding, or clicking "like", so as to fully reflect users' interests in the video files.

Figure 4:
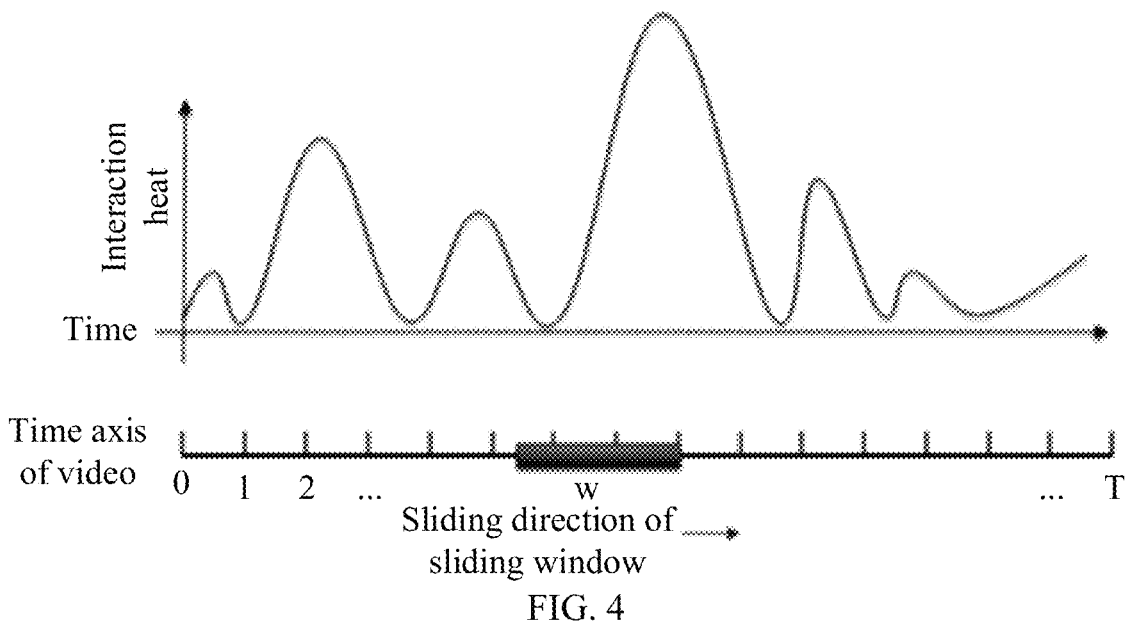
FIG. 4 is a schematic diagram of a manner of determining the interaction heat at respective time points in a video clipping method according to an embodiment of the present disclosure.

The use of the interaction behavior data of the original video file counted and saved in the user behavior database can determine the interaction heat of the original video file at respective time points. The present disclosure may use a sliding window to determine the interaction heat at respective time points. FIG. 4 is a schematic diagram of a manner of determining the interaction heat at respective time points in a video clipping method according to an embodiment of the present disclosure.

As shown in FIG. 4, the embodiments of the present disclosure may adopt a sliding window to slide on a time axis of the original video file. The sliding window may have a preset time length, and the sliding window may have a sliding step equal to a time distance between adjacent time points in the original video file. A quantity of interaction behaviors within a range of the sliding window slid to respective positions is counted, based on the interaction behavior data. The quantity of the interaction behaviors counted at the respective positions is taken as a quantity of interaction behaviors at the respective time points. The interaction heat at the respective time points is determined, based on the quantity of the interaction behaviors at the respective time points.

A video file X having a length T and setting every 1 second to be a time point is taken as an example. A length of the sliding window is set as w (in seconds), and a sliding step of the sliding window is 1 second. As shown in FIG. 4, when the starting point of the sliding window is located at the 0th second of the video file X, the number of various interaction behaviors for the video file X within a range of the sliding window (i.e., from the 0th second to the W-th second) is counted as the number of various interaction behaviors at the time point of the 0th second; then an arithmetic sum or weighted sum of the number of various interaction behaviors at the 0th second is calculated, and the arithmetic sum or weighted sum is taken as the interaction heat at the time point of the 0th second.

The sliding window is moved according to the step, that is, the starting point of the sliding window is slid to the 1st second of the video file X, the number of various interaction behaviors for the video file X within the range of the sliding window (i.e., from the 1st second to the (w+1)th second) is counted as the number of various interaction behaviors at the time point of the 1st second; then an arithmetic sum or weighted sum of the number of various interaction behaviors in the 1st second is calculated, and the arithmetic sum or weighted sum is taken as the interaction heat at the time point of the 1st second.

This is continued until the sliding window slides to the end of the video file X, so as to determine the interaction heat at respective time points of the video file X.

The above way of calculating the interaction heat may be that: the interaction heat=a quantity of collections+a quantity of shares+a quantity of bullet comments+a quantity of comments+a quantity of rewards+a quantity of likes; or the interaction heat=A*the quantity of collections+B*the quantity of shares+C*the quantity of bullet comments+D*the quantity of comments+E*the quantity of rewards+F*the quantity of likes. Among them, A, B, C, D, E and F are the weights of the above respective quantities of interactions, which may be determined according to the actual situation or empirical value.

The above calculation method of interaction heat may take into account various interaction ways of users, and may adjust the weight of different interaction ways of users in the calculation of interaction heat as desired, so as to more accurately reflect the interaction heat at respective time points.

It should be noted that the above example is only illustrative, and the embodiments of the present disclosure does not limit the correspondence between the position of the sliding window and the time point for calculating the interaction heat. For example, when the starting point of the sliding window is at the 0th second of the video file X, the number of various interaction behaviors for the video file X within the range of the sliding window may be taken as the number of various interaction behaviors at the time point of w/2-th second, and the interaction heat at the time point of w/2-th second may be calculated based on the above. When the starting point of the sliding window is at the 1st second of the video file X, the number of various interaction behaviors for the video file X within the range of the sliding window may be taken as the number of various interaction behaviors at the time point of (1+w/2)th second, and the interaction heat at the time point of (1+w/2)th second may be calculated based on the above.

Since the time point is a point rather than a period of time, it is of little significance to count the interaction heat at a certain time. Therefore, the implementations of the present disclosure adopt a sliding window to take the interaction heat in a period of time before and after a time point as the interaction heat at the time point, which is more reasonable and easier to count.

In some implementations, the manner in which the N time points with the highest interaction heat are selected, to take the selected time points as the interest points of the original video file may include that: an interaction heat curve is determined according to the interaction heat at the respective time points, the interaction heat curve representing the interaction heat at the respective time points; a plurality of peaks on the interaction heat curve are determined; and the N time points with the highest interaction heat are selected from the plurality of peaks, to take the selected time points as the interest points of the original video file.

Figure 5:
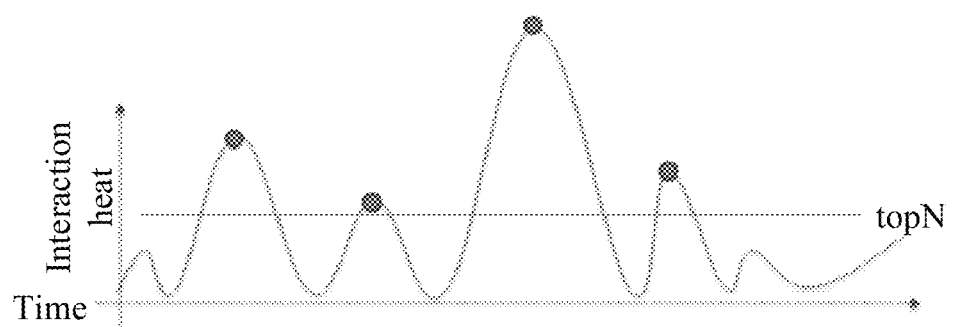
FIG. 5 is a schematic diagram of a manner of determining interest points in a video clipping method according to an embodiment of the present disclosure.

FIG. 5 is a schematic diagram of a manner of determining interest points in a video clipping method according to an embodiment of the present disclosure. As shown in FIG. 5, the interaction heat curve is determined according to the interaction heat at respective time points in the original video file. In the interaction heat curve shown in FIG. 5, the horizontal axis represents time, and each of points on the horizontal axis represents a time point. The vertical axis represents the interaction heat corresponding to the respective time points. The peak values on the interaction heat curve are determined. If the interaction heat at a time point is higher than that at its adjacent time points, the time point may be considered as a corresponding peak value. Then, the N time points with the highest interaction heat is selected from the plurality of determined peaks, and the selected N time points are taken as the Top-N interest points. Four interest points are identified in the example in FIG. 5.

The selection of the interest points from the peaks avoids that the final determined interest points are concentrated in one or a few regions, allowing that the resulted clipped short videos may be distributed in a plurality of regions of the long video.

For example, according to a descending order of interaction heat, the N time points with the highest interaction heat are taken as the points of interest, and the N points of interest are recorded as top-N=[t(1), t(2), t(3), . . . , t(i), . . . , t(n)]. In actual application scenarios, a value of N may be obtained according to business needs. There are at least two methods.
1) A quantity N of the interest points is determined, according to a pre-setting. For example, a specific number of interest points is set, for instance, N=5 is set, which means that five points with the highest interaction heat are taken as interest points.
2) A quantity N of the interest points is determined, according to a length of the original video file and a predetermined proportion.

For example, assuming that the predetermined proportion is 3%, the length of the original video file is T, and N=int(T*3%) is set, it means that 3% of the length of the original video file is taken by an integer as the number of interest points.

After N interest points are determined, the original video file may be clipped based on the respective interest points to obtain N clipped video files, and each of the clipped video files contains one interest point.

The above implementations provide two different ways of determining the number of interest points, realizing the determination of the number of finally generated short videos as required.

In some implementations, for each interest point, clipping may be performed in the following manner. A quantity of various interaction behaviors is determined at a plurality of time points before and after the interest point. The quantity of the various interaction behaviors at the plurality of time points before and after the interest point and a quantity of various interaction behaviors at the interest point are inputted into a pre-trained neural network model, to obtain a first time distance prediction value between the interest point and a clipping start point, and a second time distance prediction value between the interest points and a clipping end point. The clipping start point and the clipping end point are determined, according to the interest point, the first time distance prediction value and the second time distance prediction value. The original video file is clipped at the clipping start point and the clipping end point, to obtain a clipped video file.

The respective interest points are clipped in the above way, and finally N clipped files may be obtained. Each of the clipped video files contains one of the above interest points.

Figure 6:
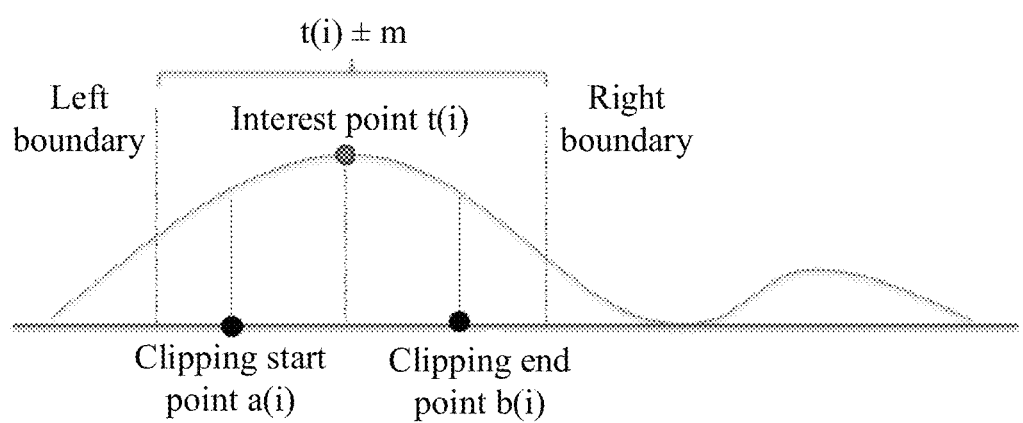
FIG. 6 is a schematic diagram of a video clipping for one interest point in a video clipping method according to an embodiment of the present disclosure.

FIG. 6 is a schematic diagram of a video clipping for one interest point in a video clipping method according to an embodiment of the present disclosure.

As shown in FIG. 6, after determining the top-N interest points, for any one interest point t(i) among them, the number of various interaction behaviors at m time points before and after the interest point t(i) is determined. Taking a time interval of 1 second between adjacent time points as an example, the number of various interaction behaviors within a time length of t(i))i can be determined. The number of various interaction behaviors at respective time points (including the interest point, which is a special time point) within the time length range of t(i))i is taken as an input X of the neural network model, as shown in Table 1 below.

TABLE 1

| | Input X | | | | | |
|---|---|---|---|---|---|---|
| Time point | Quantity of collections | Quantity of shares | Quantity of bullet comments | Quantity of comments | Quantity of rewards | Quantity of likes |
| t(i) − m | — | — | — | — | — | — |
| ... | — | — | — | — | — | — |
| t(i) − 2 | — | — | — | — | — | — |
| t(i) − 1 | — | — | — | — | — | — |
| t(i) | — | — | — | — | — | — |
| t(i) + 1 | — | — | — | — | — | — |
| t(i) + 2 | — | — | — | — | — | — |
| ... | — | — | — | — | — | — |
| t(i) + m | — | — | — | — | — | — |

An output Y of the neural network model may include a first time distance prediction value (e.g., p'(i)) between the interest point t(i) and the clipping start point (e.g., a(i) in FIG. 6), and a second time distance prediction value (e.g., q'(i)) between the interest point t(i) and the clipping end point (e.g., b(i) in FIG. 6).

According to the interest point t(i), the first time distance prediction value p'(i) and the second time distance prediction value q'(i), the positions of the clipping start point and the clipping end point may be determined, which are: a(i)=t(i)−p'(i); and b(i)=t(i)+q'(i).

The original video file is subjected to preliminary clipping at the clipping start point a(i) and the clipping end point b(i), so as to obtain the preliminarily clipped video file which contains the interest point t(i).

In the above method, a range of the plurality of time points before and after the interest point (such as the length of m in FIG. 6) may be determined by using predetermined conditions. For example, it is determined from a desired length of the clipped video file, and/or from a length of the original video file. As the range of the plurality of time points before and after the interest point is determined, a range of clipping can be determined, which may affect the length of the short video after clipping.

Figure 7:
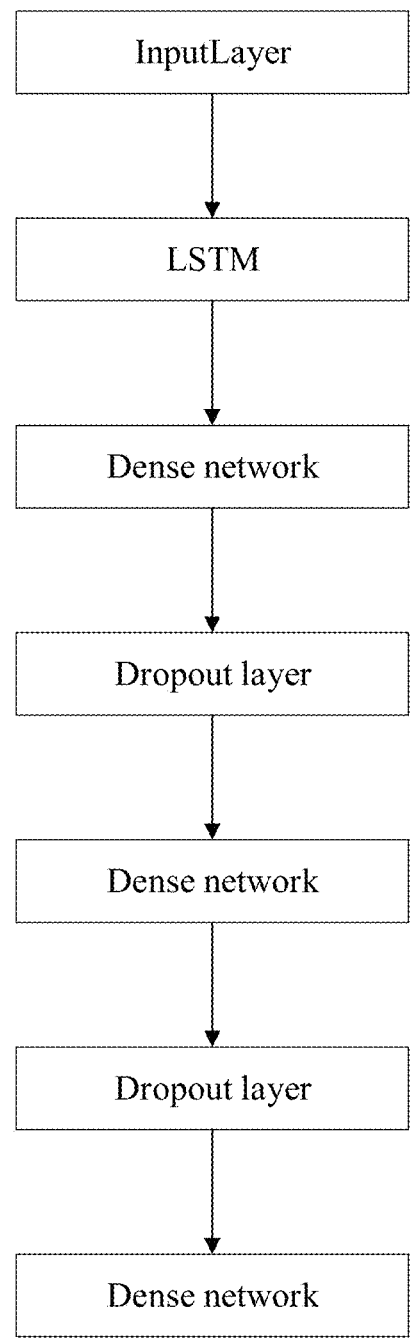
FIG. 7 is a schematic diagram of a neural network model architecture used in a video clipping method according to an embodiment of the present disclosure.

The above neural network model may include a Long Short-Term Memory (LSTM) network, or a related variant of the LSTM. The LSTM is a special type of Recurrent Neural Network (RNN), which may effectively solve the prediction problem of sequence data. FIG. 7 is a schematic diagram of a neural network model architecture used in a video clipping method according to an embodiment of the present disclosure, including: an input layer, an LSTM layer, a dense network, a dropout layer and other structures. Specific structures of the layers will not be described herein.

The use of the pre-trained neural network model for video clipping may realize fast and accurate auto-clipping without manual intervention, which greatly improves the effect and efficiency of short video clipping, saves human resources, and improves the user experience.

The present disclosure also proposes a training method for the above neural network model, which will be described in detail in subsequent embodiments.

The above clipping using neural network model may be considered as a preliminary clipping of the original video file. Because a voice of character or background sound may appear at a boundary of the preliminary clipping, which may affect the clipping effect. In order to improve the clipping effect, the disclosure may further perform secondary clipping, which is called fine tuning, on the preliminarily clipped video file, so as to avoid that the resulted short video starts or terminates in the middle of a sentence, affecting the viewing experience.

For example, a time point at which volume in the clipped video file is minimum is determined, within a boundary range of the clipped video file, and the secondary clipping is performed on the clipped video file at the time point at which the volume is minimum. The boundary range includes a range in which a time distance from a start point of the clipped video file does not exceed a first time length, and/or a range in which a time distance from an end point of the clipped video file does not exceed a second range.

Figure 8:
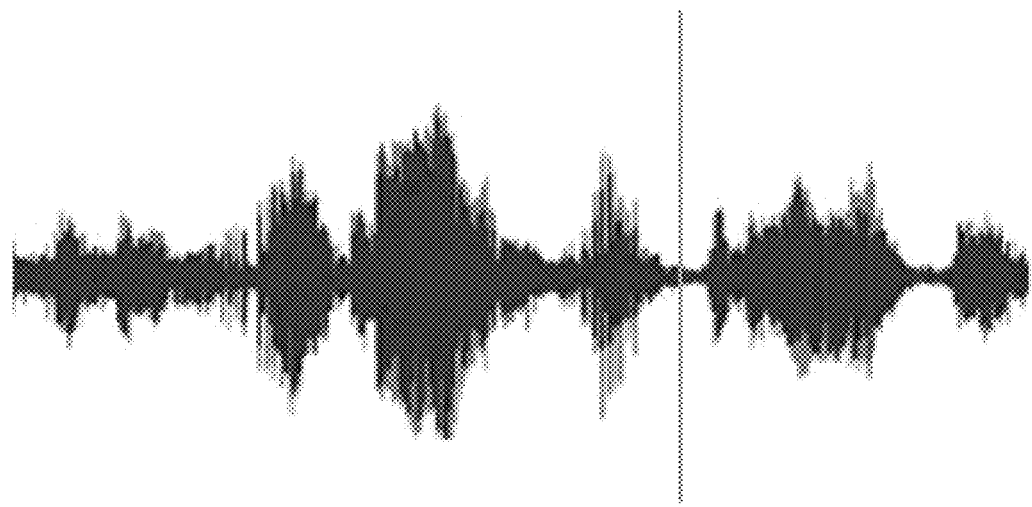
FIG. 8 is a schematic diagram of a video clipping method according to an embodiment of the present disclosure, in which clipping is performed according to a point with minimum volume.

Taking a video file with a range of [t(i)−p'(i), t(i)+q'(i)] after preliminary clipping as an example, the embodiments of the present disclosure may determine voiceprint information of the video file, and use the voiceprint information to select a time point at which the volume is minimum within two small ranges of [t(i)−p'(i), t(i)−p'(i)+++1] and [t(i)+q'(i)−−−2, t(i)+q'(i)] as a fine-tuning time point. As could be seen, Δt1 and Δt2 define the boundary range for secondary clipping, that is, the fine tuning can be made within the range in which the distance from the start point t(i)−p'(i) does not exceed Δt1 and the range in which the distance from the end point t(i)+q'(i) does not exceed Δt2. Herein, Δt1 and Δt2 may be set according to the empirical value. Δt1 and Δt2 may be the same or different. For example, Δt1 and Δt2 are both set to 2 seconds. FIG. 8 is a schematic diagram of a video clipping method according to an embodiment of the present disclosure, in which clipping is performed according to a point with minimum volume. As shown in FIG. 8, the point with minimum volume is determined within an allowed range according to voiceprint characteristics, and the point with the minimum volume is used as a point for secondary clipping.

The process of having the long video clipped to the short video is completed as above. In the above clipping process, firstly, the plurality of interest points of the user are determined. Then, based on each interest point, the pre-trained neural network model is used to determine the points for preliminary clipping at which the preliminary clipping is carried out. After the preliminary clipping, the preliminarily clipped video file is subjected to being secondarily clipped according to the volume information, so as to obtain a short video with better clipping effect.

After clipping out the short video, the present disclosure may also determine a title of the short video according to bullet screen information in the short video.

For example, a title of a clipped video file is determined, according to a bullet comment in the preliminarily clipped video file.

As an alternative, a title of the secondarily clipped video file is determined, according to a bullet comment in the secondarily clipped video file.

Because the bullet comment contains information such as user's comments on the short video content, which may reflect not only the short video content but also the user's preferences, concerns and other information, the cost of generating titles based on the existing bullet comments is lowered with a better naming effect.

Taking the determination of the title of the secondarily clipped video file according to the bullet comment in the secondarily clipped video file as an example, the method includes that: respective bullet comments appearing in the secondarily clipped video file are transformed into corresponding text vectors; for each text vector, a sum of distances between the text vector and other text vectors is determined; and the bullet comment corresponding to a text vector with a minimum sum of distances is taken as the title of the secondarily clipped video file.

In the implementations of the present disclosure, the bullet comments in the form of text are used to generate the title of the video file. The bullet comment described in the embodiments of the present disclosure generally refers to a text bullet comment or a bullet comment containing text content.

In some possible implementations, the following processes are specifically included.

In the first step, bullet screen information (or called as a bullet screen text, bullet screen text information) contained in the secondarily clipped video file is extracted, which is recorded as: txt=[txt (1), txt (2), . . . , txt (i), . . . , txt (n)].

For the above example, n pieces of bullet screen information are extracted, which are txt (1), txt (2) to txt (n).

In the second step, the respective pieces of bullet screen information are transformed into text vectors. After the transform, n corresponding text vectors are obtained, which are recorded as: vec=[vec (1), vec (2), . . . , vec (i), . . . , vec (n)].

For the above example, n corresponding text vectors are obtained, which are vec (1), vec (2) to vec (n).

The transformation mode of the text vectors may be realized by neural network models such as a Bidirectional Encoder Representations from Transformers (BERT) model, an Enhanced Language Representation with Informational Entities (ERNIE) model, and the like.

In the third step, a sum of distances between each of text vectors and the other respective text vectors is determined, respectively, for all the text vectors.

For the above example, for each of text vectors vec (i), the distances from vec (i) to the other text vectors are calculated and accumulated as sum (i), where $\text{sum}_{(i)} = \Sigma_{j=i}^{n} \text{cosine}(\text{vec}(i), \text{vec}(j))$.

The distance may be calculated by the included angle cosine formula:

$$\cos(\theta) = \frac{\sum_{i=1}^{n}(x_i \times y_i)}{\sqrt{\sum_{i=1}^{n}(x_i)^2} \times \sqrt{\sum_{i=1}^{n}(y_i)^2}}.$$

In the included angle cosine formula, $X_i$ and $Y_i$ represent the i-th element of two text vectors (text vector X and text vector Y), respectively; n represents the number of elements in text vector X or text vector Y; and $\cos(\theta)$ represents the included angle cosine between the text vector X and the text vector Y, which can represent the distance between the text vector X and the text vector Y.

The distance calculation method is not limited to the above method. Euclidean Distance and other methods may be adopted, the description of which will be omitted in the present disclosure.

After calculation, the sum of distances from each text vector to other text vectors may be recorded as: sum=[sum (1), sum (2), . . . , sum (i), . . . , sum (n)].

In the fourth step, the bullet comment corresponding to the text vector with the minimum sum of distances is determined based on a list of sums of the distances between each of the text vectors and other respective text vectors in the above steps, and the determined bullet comment is taken as the title of the short video.

Figure 9:
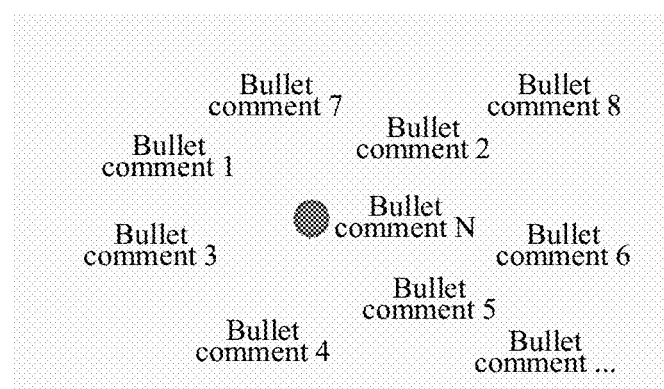
FIG. 9 is a schematic diagram of an implementation of determining a center vector in a text vector corresponding to a bullet comment in the video clipping method according to an embodiment of the present disclosure.

The above process may be considered as determining a center vector of the bullet comment. FIG. 9 is a schematic diagram of an implementation of determining the center vector in the text vector corresponding to the bullet comment in the video clipping method according to an embodiment of the present disclosure. FIG. 9 shows the text vectors corresponding to a plurality of bullet comments. Using the above method, the center vector of the bullet comment (such as the bullet comment N in FIG. 9) is determined, that is, the text vector with the smallest sum of the distances from other text vectors. The bullet comment corresponding to the text vector is taken as the title of the short video. The bullet comment may represent most recognized comment information published by a group of users in the system for this short video. Therefore, it may well represent the content of the short video or the user's views on the short video, and is very suitable to be used as the title of the short video.

The implementations of the present disclosure also propose other ways of generating the title. For example, word segmentation processing is performed on respective bullet comments in the secondarily clipped video file, to obtain a plurality of word segmentations, and an occurrence number of that each word segmentation appears in all of the bullet comments of the secondarily clipped video file is counted. L word segmentations with a maximum occurrence number are selected from the plurality of word segmentations as an important word segmentation, and a word segmentation score is set for the important word segmentation, according to an occurrence number of the important word segmentation, where L is a positive integer. The important word segmentation contained in the respective bullet comments is determined, for the respective bullet comments in the secondarily clipped video file, and a bullet screen score of the respective bullet comments is determined, according to the word segmentation score of the important word segmentation. The bullet comment with a highest bullet screen score is taken as the title of the secondarily clipped video file.

After the above word segmentation, the word segmentation that do not carry the actual meaning such as modal particles and terminators may be removed, and the word segmentation with the most frequent occurrence may be determined as the important word segmentation from the remaining word segmentations.

For example, after word segmentation and statistics, determine the most frequent p word segmentations as important word segmentations, including W1, W2, . . . , and Wp. Among them, W1 appears 100 times, W2 appears 80 times, . . . , and Wp appears 20 times. The word segmentation scores are determined for respective important word segmentations according to the occurrence times. For example, the word segmentation scores of W1, W2, . . . , and Wp are 100, 80, . . . , and 20, respectively. Then, for each bullet comment, the important word segmentation contained in each bullet comment may be determined, and the score of the important word segmentation is used as the bullet screen score of the bullet comment. For example, the scores of the important word segmentations contained in the bullet comment may be added up, to obtain a bullet screen score of the whole bullet comment.

It may be seen that the bullet comment with the highest score contains the most important comments made by the user group in the system on the short video, so it may reflect the content of the short video or the user's views on the short video and thus is very suitable for being the title of the short video.

It should be noted that the above implementations are illustrated by taking the determination of the title of the secondarily clipped video file according to the bullet comment in the secondarily clipped video file as an example. The disclosure may also determine the title of primarily clipped video file according to the bullet comment in the primarily clipped video file in the similar way. The specific implementation is the same as the above process, the description of which will not be omitted herein.

Figure 10:
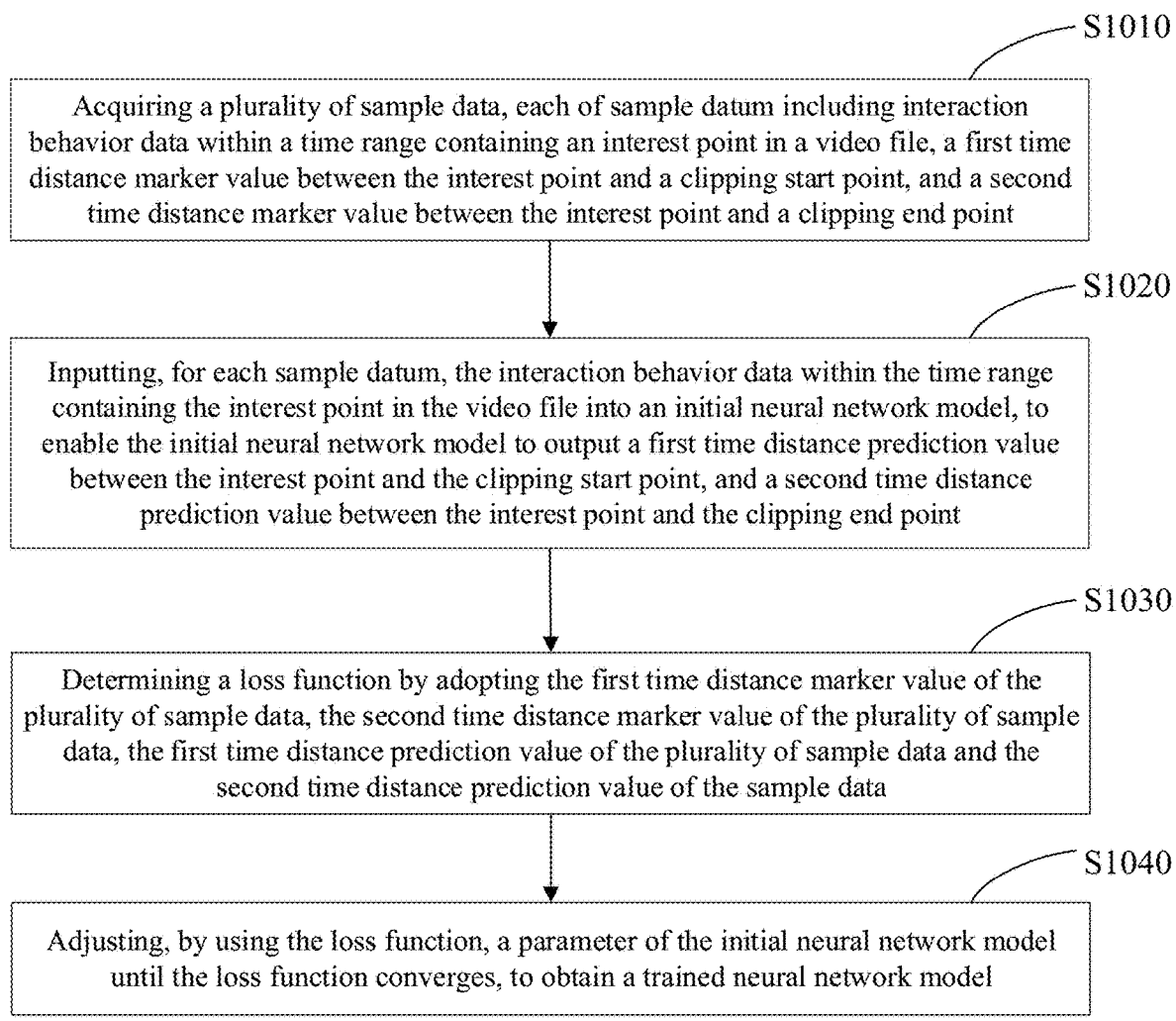
FIG. 10 is an exemplary flowchart of a training method of a neural network model according to an embodiment of the present disclosure.

The present disclosure also proposes a training method of a neural network model. As shown in FIG. 10, the method includes the followings.

In S1010, a plurality of sample data are acquired. Each sample datum includes interaction behavior data within a time range containing an interest point in a video file, a first time distance marker value between the interest point and a clipping start point, and a second time distance marker value between the interest point and a clipping end point.

In S1020, for each sample datum, the interaction behavior data within the time range containing the interest point in the video file is inputted into an initial neural network model, to enable the initial neural network model to output a first time distance prediction value between the interest point and the clipping start point, and a second time distance prediction value between the interest point and the clipping end point.

In S1030, a loss function is determined by adopting the first time distance marker value of the plurality of sample data, the second time distance marker value of the plurality of sample data, the first time distance prediction value of the plurality of sample data and the second time distance prediction value of the plurality of sample data.

In S1040, a parameter of the initial neural network model is adjusted by using the loss function, until the loss function converges, to obtain a trained neural network model.

In some possible implementations, the interaction behavior data within the time range containing the interest point in the video file includes: a quantity of various interaction behaviors at respective time points within the time range containing interest points and a quantity of various interaction behaviors at the interest point.

In some possible implementations, the determination of the loss function by adopting the first time distance marker value of the plurality of sample data, the second time distance marker value of the plurality of sample data, the first time distance prediction value of the plurality of sample data and the second time distance prediction value of the plurality of sample data, includes: for each sample of a plurality of samples, determining a square of a difference value between a first time distance marker value of the sample and a first time distance prediction value of the sample as a first square value, and determining a square of a difference value between a second time distance marker value of the sample and a second time distance prediction value of the sample as a second square value; and determining a mean value of first square values and second square values of the plurality of samples, to take the mean value as the loss function.

For example, the following formula can be used to calculate the loss function:

$$\text{LOSS} = \frac{1}{2n}\sum_{1}^{n}\left[(p(i) - p'(i))^2 + (q(i) - q'(i))^2\right],$$

where, LOSS is the loss function; p(i) represents the first time distance marker value corresponding to the i-th sample; p'(i) represents the first time distance prediction value corresponding to the i-th sample; q(i) represents the second time distance marker value corresponding to the i-th sample; q'(i) represents the second time distance prediction value corresponding to the i-th sample; and n is the number of samples.

In some possible implementations, the above interaction behavior includes at least one of: collecting, sharing, posting a bullet comment, posting a comment, rewarding or clicking "like".

In some possible implementations, before acquiring the plurality of sample data as described above, the method further includes: acquiring interaction behavior data for the video file; determining interaction heat at respective time points of the video file, according to the interaction behavior data; and selecting M time points with highest interaction heat, to take the selected time points as the interest point of the video file, where M is a positive integer.

In some possible implementations, the above determination of the interaction heat at the respective time points of the video file according to the interaction behavior data, includes: adopting a sliding window to slide on a time axis of the video file, where the sliding window has a preset time length, and the sliding window has a sliding step equal to a time distance between adjacent time points in the video file; counting a quantity of interaction behaviors within a range of the sliding window slide to respective positions, based on the interaction behavior data; taking the quantity of the interaction behaviors counted at the respective positions as a quantity of interaction behaviors at the respective time points; and determining the interaction heat at the respective time points, based on the quantity of the interaction behaviors at the respective time points.

In some possible implementations, the above selection of the M time points with the highest interaction heat to take the selected time points as the interest points of the video file, includes: determining an interaction heat curve, according to the interaction heat at the respective time points, where the interaction heat curve represents the interaction heat at the respective time points; determining a plurality of peaks on the interaction heat curve; and selecting the M time points with the highest interaction heat from the plurality of peaks, to take the selected time points as the interest points of the video file.

In some possible implementations, the interaction behavior data within the time range containing the interest point in the video file includes: a quantity of various interaction behaviors at the interest point within the time range and a quantity of various interaction behaviors at a plurality of time points before and after the interest point.

In some possible implementations, the above neural network model includes a Long Short-Term Memory (LSTM) network, or a related variant of the LSTM.

The method of determining the number of interaction behaviors at respective time points have been introduced in the above implementations, the description of which will not be repeated herein.

Figure 11:
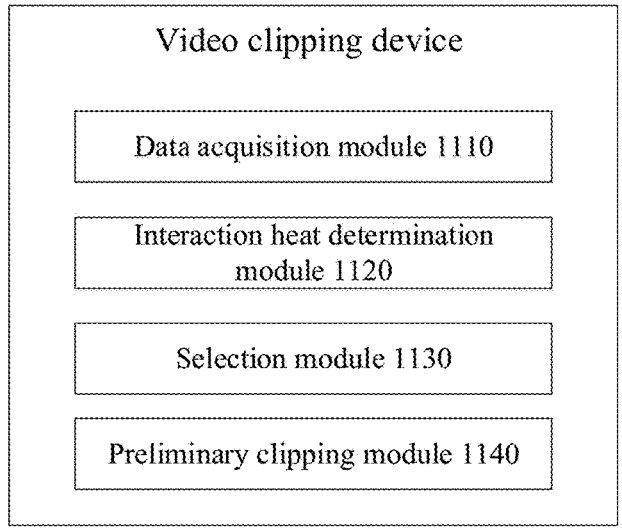
FIG. 11 is an exemplary configuration diagram of a video clipping device according to an embodiment of the present disclosure.

The present disclosure also proposes a video clipping device. As shown in FIG. 11, the video clipping device includes: a data acquisition module 1110 configured to acquire interaction behavior data for an original video file; an interaction heat determination module 1120 configured to determine interaction heat at respective time points of the original video file, according to the interaction behavior data; a selection module 1130 configured to select N time points with highest interaction heat, to take the selected time points as interest points of the original video file, where N is a positive integer; and a preliminary clipping module 1140 configured to clip the original video file based on the respective interest points, to obtain N clipped video files.

Figure 12:
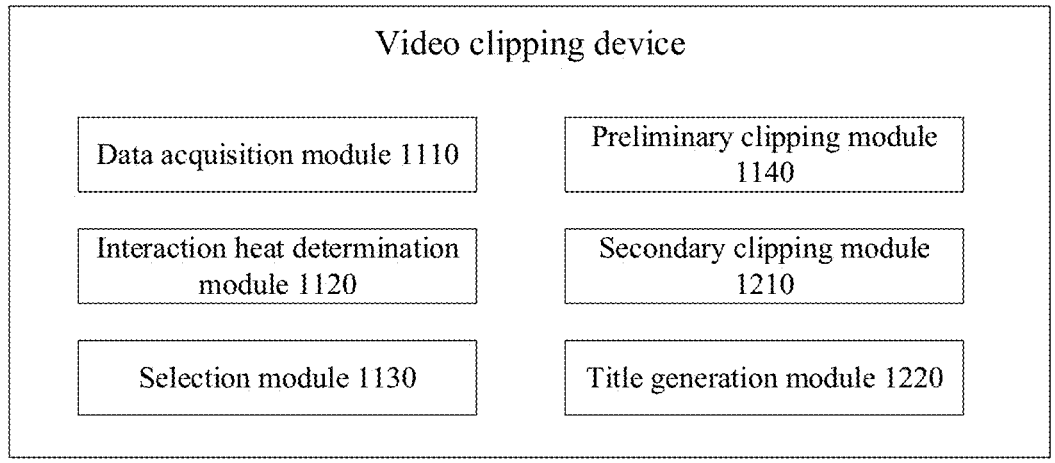
FIG. 12 is an exemplary configuration diagram of a video clipping device according to another embodiment of the present disclosure.

In some implementations, the present disclosure also proposes a video clipping device. As shown in FIG. 12, the video clipping device further includes: a secondary clipping module 1210 configured to perform secondary clipping on a clipped video file, according to volume information in the clipped video file.

In some implementations, the above data acquisition module 1110 is configured to: acquire the interaction behavior data for the original video file, from a user behavior database. The user behavior database records interaction behavior data of a plurality of video files from a video playback terminal, and the interaction behavior data of the plurality of video files includes at least one of an identifier of each video file, a total duration of each video file, an interaction behavior of the video file, or a time point of the interaction behavior in the video file.

In some implementations, the interaction behavior includes at least one of: collecting, sharing, posting a bullet comment, posting a comment, rewarding, or clicking "like".

In some implementations, the above interaction heat determination module 1120 is configured to: adopt a sliding window to slide on a time axis of the original video file, where the sliding window has a preset time length, and the sliding window has a sliding step equal to a time distance between adjacent time points in the original video file; count a quantity of interaction behaviors within a range of the sliding window slid to respective positions, based on the interaction behavior data; take the quantity of the interaction behaviors counted at the respective positions as a quantity of interaction behaviors at the respective time points; and determine the interaction heat at the respective time points, based on the quantity of the interaction behaviors at the respective time points.

In some implementations, the above interaction heat determination module 1120 is configured to: determine, for each time point, an arithmetic sum or a weighted sum of quantities of various interaction behaviors at the time point; and take the arithmetic sum or the weighted sum as interaction heat at the time point.

In some implementations, the above selection module 1130 is configured to: determine an interaction heat curve, according to the interaction heat at the respective time points, the interaction heat curve representing the interaction heat at the respective time points; determine a plurality of peaks on the interaction heat curve; and selecting the N time points with the highest interaction heat from the plurality of peaks, to take the selected time points as interest points of the original video file.

In some implementations, the above selection module 1130 is further configured to: determine a quantity N of the interest points, according to a pre-setting.

Alternatively, in some implementations, the above selection module 1130 is further configured to: determine a quantity N of the interest points, according to a length of the original video file and a predetermined proportion.

In some implementations, the above preliminary clipping module 1140 is configured to: determine, for each interest point, a quantity of interaction behaviors at a plurality of time points before and after the interest point; input the quantity of interaction behaviors at the plurality of time points before and after the interest point and a quantity of interaction behaviors at the interest point into a pre-trained neural network model, to obtain a first time distance prediction value between the interest point and a clipping start point, and a second time distance prediction value between the interest point and a clipping end point; determine the clipping start point and the clipping end point, according to the interest points, the first time distance prediction value and the second time distance prediction value; and clip the original video file at the clipping start point and the clipping end point, to obtain a clipped video file.

In some implementations, the above preliminary clipping module 1140 is further configured to: determine a range of the plurality of time points before and after the interest point according to a predetermined condition.

In some implementations, the pre-trained neural network model includes a Long Short-Term Memory (LSTM) network, or a related variant of the LSTM.

In some implementations, the above secondary clipping module 1210 is configured to: determine, within a boundary range of the clipped video file, a time point at which volume in the clipped video file is minimum, and perform the secondary clipping on the clipped video file at the time point at which the volume is minimum. The boundary range includes a range in which a time distance from a start point of the clipped video file does not exceed a first time length, and/or a range in which a time distance from an end point of the clipped video file does not exceed a second range.

In some implementations, the video clipping device further includes: a title generation module 1220 configured to determine a title of a clipped video file, according to a bullet comment in the clipped video file.

Alternatively, the above title generation module 1220 is configured to determine a title of the secondarily clipped video file, according to a bullet comment in secondarily clipped video file.

In some implementations, the above title generation module 1220 is configured to: transform respective bullet comments appearing in the secondarily clipped video file into corresponding text vectors; determine, for each text vector, a sum of distances between the text vector and other text vectors; and take the bullet comment corresponding to a text vector with a minimum sum of distances as the title of the secondarily clipped video file.

In some implementations, a manner in which a distance between the text vector and another text vector is determined includes: calculating an included angle cosine between the text vector and the other text vector, to take the included angle cosine as the distance between the text vector and the other text vector; or calculating a Euclidean Distance between the text vector and the other text vector, to take the Euclidean Distance as the distance between the text vector and the other text vector.

In some implementations, the above title generation module 1220 is configured to: perform word segmentation processing on respective bullet comments in the secondarily clipped video file, to obtain a plurality of word segmentations, and count an occurrence number of that each word segmentation appears in all of the bullet comments of the secondarily clipped video file; select L word segmentations with a maximum occurrence number from the plurality of word segmentations as an important word segmentation, and set a word segmentation score for the important word segmentation, according to an occurrence number of the important word segmentation, where L is a positive integer; determine, for the respective bullet comments in the secondarily clipped video file, the important word segmentation contained in the respective bullet comments, and determine a bullet screen score of the respective bullet comments, according to the word segmentation score of the important word segmentation; and take the bullet comment with a highest score as the title of the secondarily clipped video file.

Figure 13:
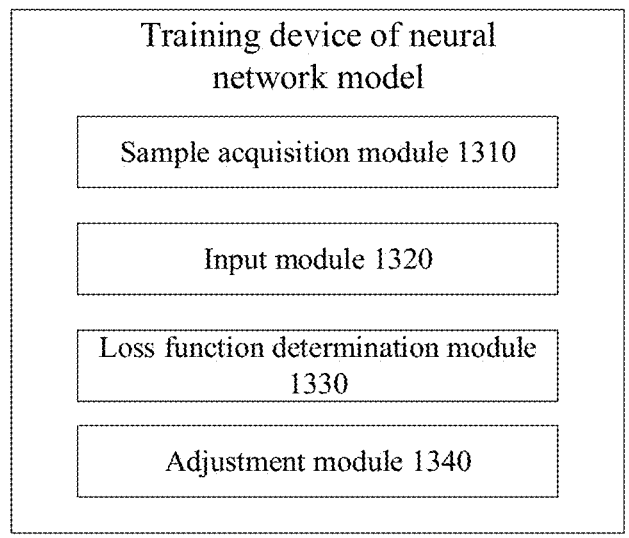
FIG. 13 is an exemplary structure diagram of a training device of a neural network model according to an embodiment of the present disclosure.

The present disclosure also proposes a training device for a neural network model. As shown in FIG. 13, the training device for the neural network model includes: a sample acquisition module 1310 configured to acquire a plurality of sample data, where each sample datum includes interaction behavior data within a time range containing an interest point in a video file, a first time distance marker value between the interest point and a clipping start point, and a second time distance marker value between the interest point and a clipping end point; an input module 1320 configured to input, for each sample datum, the interaction behavior data within the time range containing the interest point in the video file into an initial neural network model, to enable the initial neural network model to output a first time distance prediction value between the interest point and the clipping start point, and a second time distance prediction value between the interest point and the clipping end point; a loss function determination module 1330 configured to determine a loss function by adopting the first time distance marker value of the plurality of sample data, the second time distance marker value of the plurality of sample data, the first time distance prediction value of the plurality of sample data and the second time distance prediction value of the plurality of sample data; and an adjustment module 1340 configured to adjust, by using the loss function, a parameter of the initial neural network model until the loss function converges, to obtain a trained neural network model.

In some implementations, the interaction behavior data within the time range containing the interest point in the video file includes: a quantity of various interaction behaviors at respective time points within the time range and a quantity of various interaction behaviors at the interest point.

In some implementations, the above loss function determination module 1330 is configured to: for each sample of a plurality of samples, determine a square of a difference value between a first time distance marker value of the sample and a first time distance prediction value of the sample as a first square value, and determine a square of a difference value between a second time distance marker value of the sample and a second time distance prediction value of the sample as a second square value; and determine a mean value of first square values and second square values of the plurality of samples, to take the mean value as the loss function.

In some implementations, the interaction behavior includes at least one of: collecting, sharing, posting a bullet comment, posting a comment, rewarding or clicking "like".

In some implementations, the above sample acquisition module 1310 is further configured to: acquire interaction behavior data for a video file; determine interaction heat at respective time points of the video file, according to the interaction behavior data; and select M time points with highest interaction heat, to take the selected time points as the interest point of the video file, where M is a positive integer.

In some implementations, the above sample acquisition module 1310 is configured to: adopt a sliding window to slide on a time axis of the video file, where the sliding window has a preset time length, and the sliding window has a sliding step equal to a time distance between adjacent time points in the video file; count a quantity of interaction behaviors within a range of the sliding window slide to respective positions, based on the interaction behavior data; take the quantity of the interaction behaviors counted at the respective positions as a quantity of interaction behaviors at the respective time points; and determine the interaction heat at the respective time points, based on the quantity of the interaction behavior at the respective time points.

In some implementations, the above sample acquisition module 1310 is configured to: determine an interaction heat curve, according to the interaction heat at the respective time points, where the interaction heat curve represents the interaction heat at the respective time points; determine a plurality of peaks on the interaction heat curve; and select the M time points with the highest interaction heat from the plurality of peaks, to take the selected time points as the interest point of the video file.

In some implementations, the interaction behavior data within the time range containing the interest points in the video file includes: a quantity of various interaction behaviors at the interest points within the time range and a quantity of various interaction behaviors at a plurality of time points before and after the interest point.

In some implementations, the above neural network model includes a Long Short-Term Memory (LSTM) network, or a related variant of the LSTM.

In the technical solutions of the present disclosure, the collection, the storage and the application of user's personal information involved herein are all in compliance with the provisions of relevant laws and regulations, and do not violate public order and good customs.

According to embodiments of the present disclosure, the present disclosure also provides an electronic device, a readable storage medium and a computer program product.

Figure 14:
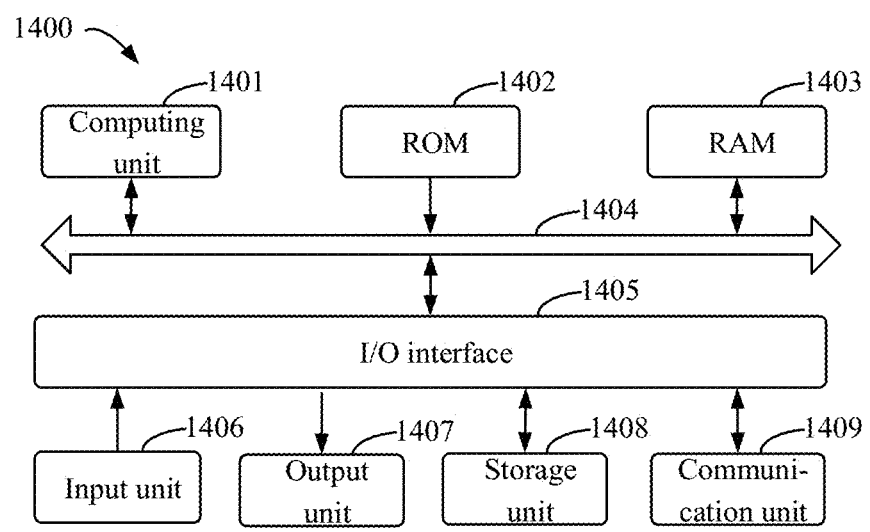
FIG. 14 is a block diagram of an electronic device for implementing a video clipping method or a training method of a neural network model according to the embodiments of the present disclosure.

FIG. 14 illustrates a schematic block diagram of an example electronic device 1400 that may be used to implement embodiments of the present disclosure. Electronic devices intended to represent various forms of digital computers, such as laptops, desktops, workstations, personal digital assistants, servers, blade servers, mainframe computers and other suitable computers. Electronic devices may also represent various forms of mobile devices, such as personal digital processing, cellular phones, smart phones, wearable devices and other similar computing devices. Components shown herein, their connections and relationships as well as their functions are merely exemplary, and are not intended to limit the implementation of the present disclosure described and/or claimed herein.

As shown in FIG. 14, the electronic device 1400 includes a computing unit 1401 that may perform various appropriate actions and processes according to a computer program stored in a Read Only Memory (ROM) 1402 or a computer program loaded from a storage unit 1408 into a Random Access Memory (RAM) 1403. In RAM 1403, various programs and data required for the operation of the electronic device 1400 may also be stored. The computing unit 1401, the ROM 1402 and the RAM 1403 are connected each other through a bus 1404. An input/output (I/O) interface 1405 is also connected to the bus 1404.

A plurality of components in the electronic device 1400 are connected to the I/O interface 1405, and include an input unit 1406 such as a keyboard, a mouse and the like, an output unit 1407 such as various types of displays, speakers, and the like, a storage unit 1408 such as a magnetic disk, an optical disk and the like, and a communication unit 1409 such as a network card, a modem, a wireless communication transceiver and the like. The communication unit 1409 allows the electronic device 1400 to exchange information/data with other devices through computer networks such as Internet and/or various telecommunication networks.

The computing unit 1401 may be various general-purpose and/or special-purpose processing components with processing and computing capabilities. Some examples of the computing unit 1401 include, but are not limited to, a Central Processing Unit (CPU), a Graphics Processing Unit (GPU), various dedicated Artificial Intelligence (AI) computing chips, various computing units running machine learning model algorithms, a Digital Signal Processors (DSP), and any appropriate processors, controllers, microcontrollers and the like. The computing unit 1401 performs various methods and processes described above, such as a video clipping method or a training method of a neural network model. For example, in some implementations, the video clipping method or the training method of a neural network model may be implemented as a computer software program that is tangibly contained in a machine-readable medium, such as the storage unit 1408. In some implementations, part or all of the computer program may be loaded and/or installed on the electronic device 1400 via ROM 1402 and/or the communication unit 1409. When the computer program is loaded into RAM 1403 and executed by the computing unit 1401, one or more steps of the video clipping method or the training method of a neural network model described above may be performed. Alternatively, in other implementations, the computing unit 1401 may be configured to perform the video clipping method or the training method of a neural network model by any other suitable means (e.g., by means of firmware).

Various implementations of the systems and technologies described above in this paper may be implemented in a digital electronic circuit system, an integrated circuit system, a Field Programmable Gate Array (FPGA), an Application Specific Integrated Circuit (ASIC), an Application Specific Standard Product (ASSP), a System on Chip (SOC), a Load Programmable Logic Device (CPLD), a computer hardware, firmware, software, and/or combinations thereof. These various implementations may include an implementation in one or more computer programs that may be executed and/or interpreted on a programmable system including at least one programmable processor. The programmable processor may be a dedicated or general-purpose programmable processor, may receive data and instructions from a storage system, at least one input device, and at least one output device, and transmit data and instructions to the storage system, the at least one input device and the at least one output device.

The program code for implementing the methods of the present disclosure may be written in any combination of one or more programming languages. These program codes may be provided to a processor or a controller of general-purpose computer, a special-purpose computer or other programmable data processing device, so that when executed by the processor or controller, the program code enables the functions/operations specified in the flow chart and/or block diagram to be implemented. The program code may be executed completely on a machine, partially on a machine, partially on a machine and partially on a remote machine, or completely on a remote machine or server as a separate software package.

In the context of the present disclosure, the machine-readable medium may be a tangible medium that may contain or store a program for use by or in combination with an instruction execution system, device or device. The machine-readable medium may be a machine-readable signal medium or a machine-readable storage medium. The machine readable medium may include, but are not limited to, electronic, magnetic, optical, electromagnetic, infrared, or semiconductor systems, devices or equipment, or any suitable combination of the above. More specific examples of the machine-readable storage medium may include an electrical connection based on one or more lines, a portable computer disk, a hard disk, a Random Access Memory (RAM), a Read Only Memory (ROM), an Erasable Programmable Read Only Memory (EPROM or flash memory), an optical fiber, a portable Compact Disk Read Only Memory (CD-ROM), an optical storage device, a magnetic storage device, or any suitable combination of the above.

In order to provide interaction with a user, the systems and technologies described herein may be implemented on a computer that has a display device (e.g., a Cathode Ray Tube (CRT) or a Liquid Crystal Display (LCD) monitor) for displaying information to the user and a keyboard and a pointing device (e.g., a mouse or a trackball) through which the user may provide input to the computer. Other types of devices may also be used to provide interaction with the user. For example, feedback provided to the user may be any form of sensory feedback (e.g., visual feedback, auditory feedback, or tactile feedback), and the input from the user can be received in any form (including acoustic input, voice input, or tactile input).

The systems and technologies described herein may be implemented in a computing system that includes a back-end component (e.g., as a data server), a computing system that includes a middleware component (e.g., as an application server), a computing system that includes a front-end component (e.g., as a user computer with a graphical user interface or web browser through which the user may interact with the implementation of the systems and technologies described herein), or a computing system that includes any combination of the back-end component, the middleware component, or the front-end component. The components of the system may be connected to each other through digital data communication (e.g., a communication network) in any form or medium. Examples of the communication network include a Local Area Network (LAN), a Wide Area Network (WAN), and Internet.

A computer system may include a client and a server. The client and the server are generally far away from each other and usually interact through a communication network. A relationship between the client and the server arises by a computer program running on a corresponding computer and having a client-server relationship with each other. The server may be a cloud server, a server of a distributed system, or a server combined with a block chain.

It should be understood that various forms of processes shown above may be used to reorder, add or delete steps. For example, steps described in the present disclosure may be executed in parallel, sequentially, or in a different order, as long as the desired result of the technical solution disclosed in the present disclosure may be achieved, but is not limited herein.

The foregoing specific implementations do not constitute a limitation to the protection scope of the present disclosure. Those having ordinary skill in the art should understand that various modifications, combinations, sub-combinations and substitutions may be made according to design requirements and other factors. Any modification, equivalent and improvement made within the spirit and principle of the present disclosure should be included in the protection scope of the present disclosure.

What is claimed is:

1. A video clipping method, comprising:
   acquiring, by a video clipping device, interaction behavior data for an original video file;
   determining, by the video clipping device, interaction heat at respective time points of the original video file, according to the interaction behavior data;
   selecting, by the video clipping device, N time points with highest interaction heat, to take the selected time points as interest points of the original video file, wherein N is a positive integer;
   clipping, by the video clipping device, the original video file based on the respective interest points, to obtain N clipped video files;
   performing, by the video clipping device, secondary clipping on a clipped video file, according to volume information in the clipped video file; and
   determining, by the video clipping device, a title of the secondarily clipped video file, according to a bullet comment in the secondarily clipped video file, comprising:
      transforming respective bullet comments appearing in the secondarily clipped video file into corresponding text vectors;
      determining, for each text vector, a sum of distances between the text vector and other text vectors; and
      taking the bullet comment corresponding to a text vector with a minimum sum of distances as the title of the secondarily clipped video file.

2. The method of claim 1, wherein acquiring the interaction behavior data for the original video file, comprises:
   acquiring the interaction behavior data for the original video file, from a user behavior database;
   wherein the user behavior database records interaction behavior data of a plurality of video files from a video playback terminal, and the interaction behavior data of the plurality of video files comprises at least one of: an identifier of each video file, a total duration of the video file, an interaction behavior of the video file, or a time point of the interaction behavior in the video file.

3. The method of claim 1, wherein determining the interaction heat at the respective time points of the original video file according to the interaction behavior data, comprises:
   adopting a sliding window to slide on a time axis of the original video file, wherein the sliding window has a preset time length, and the sliding window has a sliding step equal to a time distance between adjacent time points in the original video file;
   counting a quantity of interaction behaviors within a range of the sliding window slid to respective positions, based on the interaction behavior data;
   taking the quantity of the interaction behaviors counted at the respective positions as a quantity of interaction behaviors at the respective time points; and
   determining the interaction heat at the respective time points, based on the quantity of the interaction behaviors at the respective time points.

4. The method of claim 3, wherein determining the interaction heat at the respective time points based on the quantity of the interaction behaviors at the respective time points, comprises:
   determining, for each time point, an arithmetic sum or a weighted sum of quantities of various interaction behaviors at the time point; and
   taking the arithmetic sum or the weighted sum as interaction heat at the time point.

5. The method of claim 4, wherein selecting the N time points with the highest interaction heat, to take the selected time points as the interest points of the original video file, comprises:
   determining an interaction heat curve, according to the interaction heat at the respective time points, wherein the interaction heat curve represents the interaction heat at the respective time points;
   determining a plurality of peaks on the interaction heat curve; and
   selecting the N time points with the highest interaction heat from the plurality of peaks, to take the selected time points as the interest points of the original video file.

6. The method of claim 5, before selecting the N time points with the highest interaction heat from the plurality of peaks, further comprising:
   determining a quantity N of the interest points, according to a pre-setting; or
   determining a quantity N of the interest points, according to a length of the original video file and a predetermined proportion.

7. The method of claim 4, wherein the clipping of the original video file based on the respective interest to obtain the N clipped video files, comprises:
   determining, for each interest point, a quantity of interaction behaviors at a plurality of time points before and after the interest point;
   inputting the quantity of the interaction behaviors at the plurality of time points before and after the interest point and a quantity of interaction behaviors at the interest point into a pre-trained neural network model, to obtain a first time distance prediction value between the interest point and a clipping start point, and a second time distance prediction value between the interest point and a clipping end point;
   determining the clipping start point and the clipping end point, according to the interest point, the first time distance prediction value and the second time distance prediction value; and
   clipping the original video file at the clipping start point and the clipping end point, to obtain a clipped video file;
   wherein the pre-trained neural network model comprises a Long Short-Term Memory (LSTM) network, or a related variant of the LSTM.

8. The method of claim 7, further comprising: determining a range of the plurality of time points before and after the interest point according to a predetermined condition.

9. The method of claim 1, wherein performing the secondary clipping on the clipped video file according to the volume information in the clipped video file, comprises:

determining, within a boundary range of the clipped video file, a time point at which volume in the clipped video file is minimum; and performing the secondary clipping on the clipped video file at the time point at which the volume is minimum;

wherein the boundary range comprises a range in which a time distance from a start point of the clipped video file does not exceed a first time length, and/or a range in which a time distance from an end point of the clipped video file does not exceed a second range.

10. The method of claim 1, further comprising: determining a title of a clipped video file, according to a bullet comment in the clipped video file.

11. The method of claim 1, wherein a manner in which a distance between the text vector and another text vector is determined comprises:

calculating an included angle cosine between the text vector and the other text vector, to take the included angle cosine as the distance between the text vector and the other text vector; or, calculating a Euclidean Distance between the text vector and the other text vector, to take the Euclidean Distance as the distance between the text vector and the other text vector.

12. An electronic device, comprising:

at least one processor; and a memory connected in communication with the at least one processor, wherein the memory stores instructions executable by the at least one processor, and the instructions are executed by the at least one processor to enable the at least one processor to execute the method of claim 1.

13. A non-transitory computer-readable storage medium storing computer instructions thereon, wherein the computer instructions are used to enable a computer to execute the method of claim 1.

14. A video clipping method, comprising:

acquiring, by a video clipping device, interaction behavior data for an original video file;

determining, by the video clipping device, interaction heat at respective time points of the original video file, according to the interaction behavior data;

selecting, by the video clipping device, N time points with highest interaction heat, to take the selected time points as interest points of the original video file, wherein N is a positive integer;

clipping, by the video clipping device, the original video file based on the respective interest points, to obtain N clipped video files;

performing, by the video clipping device, secondary clipping on a clipped video file, according to volume information in the clipped video file; and determining, by the video clipping device, a title of the secondarily clipped video file, according to a bullet comment in the secondarily clipped video file, comprising:

performing word segmentation processing on respective bullet comments in the secondarily clipped video file, to obtain a plurality of word segmentations;

counting an occurrence number of that each word segmentation appears in all of the bullet comments of the secondarily clipped video file;

selecting L word segmentations with a maximum occurrence number from the plurality of word segmentations as an important word segmentation, wherein L is a positive integer;

setting a word segmentation score for the important word segmentation, according to an occurrence number of the important word segmentation;

determining, for the respective bullet comments in the secondarily clipped video file, the important word segmentation contained in the respective bullet comments;

determining a bullet screen score of the respective bullet comments, according to the word segmentation score of the important word segmentation; and taking the bullet comment with a highest bullet screen score as the title of the secondarily clipped video file.

15. The method of claim 14, wherein acquiring the interaction behavior data for the original video file, comprises:

acquiring the interaction behavior data for the original video file, from a user behavior database;

wherein the user behavior database records interaction behavior data of a plurality of video files from a video playback terminal, and the interaction behavior data of the plurality of video files comprises at least one of: an identifier of each video file, a total duration of the video file, an interaction behavior of the video file, or a time point of the interaction behavior in the video file.

16. The method of claim 14, wherein determining the interaction heat at the respective time points of the original video file according to the interaction behavior data, comprises:

adopting a sliding window to slide on a time axis of the original video file, wherein the sliding window has a preset time length, and the sliding window has a sliding step equal to a time distance between adjacent time points in the original video file;

counting a quantity of interaction behaviors within a range of the sliding window slid to respective positions, based on the interaction behavior data;

taking the quantity of the interaction behaviors counted at the respective positions as a quantity of interaction behaviors at the respective time points; and determining the interaction heat at the respective time points, based on the quantity of the interaction behaviors at the respective time points.

17. The method of claim 14, wherein performing the secondary clipping on the clipped video file according to the volume information in the clipped video file, comprises:

determining, within a boundary range of the clipped video file, a time point at which volume in the clipped video file is minimum; and performing the secondary clipping on the clipped video file at the time point at which the volume is minimum;

wherein the boundary range comprises a range in which a time distance from a start point of the clipped video file does not exceed a first time length, and/or a range in which a time distance from an end point of the clipped video file does not exceed a second range.

18. The method of claim 14, further comprising: determining a title of a clipped video file, according to a bullet comment in the clipped video file.

19. An electronic device, comprising:

at least one processor; and a memory connected in communication with the at least one processor, wherein the memory stores instructions executable by the at least one processor, and the instructions are executed by the at least one processor to enable the at least one processor to execute the method of claim 14.

20. A non-transitory computer-readable storage medium storing computer instructions thereon, wherein the computer instructions are used to enable a computer to execute the method of claim 14.

\* \* \* \* \*